(12) United States Patent
Tisserand et al.

(10) Patent No.: US 9,055,355 B2
(45) Date of Patent: **\*Jun. 9, 2015**

(54) METHOD FOR TRANSMITTING MINI-MESSAGES AND ASSOCIATED DEVICE

(71) Applicant: DRNC Holdings, Inc., Wilmington, DE (US)

(72) Inventors: Bruno Tisserand, Colombes (FR); Luc Davit, Paris (FR)

(73) Assignee: DRNC Holdings, Inc., Wilmington, DE (US)

( \* ) Notice: Subject to any disclaimer, the term of this patent is extended or adjusted under 35 U.S.C. 154(b) by 0 days.

This patent is subject to a terminal disclaimer.

(21) Appl. No.: 13/966,871

(22) Filed: Aug. 14, 2013

(65) Prior Publication Data

US 2013/0331134 A1 Dec. 12, 2013

Related U.S. Application Data

(63) Continuation of application No. 09/913,885, filed as application No. PCT/FR00/03614 on Dec. 20, 2000, now Pat. No. 8,521,803.

(30) Foreign Application Priority Data

Dec. 20, 1999 (FR) ...................................... 99 16050

(51) Int. Cl.
*H04Q 11/04* (2006.01)
*H04L 29/06* (2006.01)
(Continued)

(52) U.S. Cl.
CPC ........ *H04Q 11/0428* (2013.01); *H04L 63/0853* (2013.01); *H04W 4/12* (2013.01); *H04W 12/06* (2013.01); *H04W 28/06* (2013.01); *H04W 76/02* (2013.01)

(58) Field of Classification Search
CPC ....... H04W 4/12; H04W 12/06; H04W 28/06; H04W 76/02; H04L 63/0853; H04Q 11/0428
USPC ........... 709/201–203; 340/7.21; 455/450, 470
See application file for complete search history.

(56) References Cited

U.S. PATENT DOCUMENTS 5,337,044 A \* 8/1994 Folger et al. ................... 340/7.1
5,351,235 A \* 9/1994 Lahtinen ....................... 370/259
(Continued)

FOREIGN PATENT DOCUMENTS

EP 1009153 8/2011
JP 05-007259 1/1993
(Continued)

OTHER PUBLICATIONS

"Japanese Final Notice of Rejection", Japanese Application No. 2001-547807, Feb. 18, 2011, 2 pages.
(Continued)

*Primary Examiner* — Backhean Tiv
(74) *Attorney, Agent, or Firm* — Theodore Naccarella

(57) ABSTRACT

To reduce the call cost for user messages of a few tens of bytes through a mobile telephone network (3), and to avoid having to set up a call channel as is necessary for transmitting data of several thousands of bytes, spare fields in signaling messages are used to convey the user messages, a call then taking place via signaling messages, and without a dedicated call channel being set up.

20 Claims, 2 Drawing Sheets

(51) Int. Cl.
*H04W 4/12* (2009.01)
*H04W 12/06* (2009.01)
*H04W 28/06* (2009.01)
*H04W 76/02* (2009.01)

(56) References Cited

U.S. PATENT DOCUMENTS

| | | | |
|---|---|---|---|
| 5,502,721 A | | 3/1996 | Pohjakallio |
| 5,541,915 A * | | 7/1996 | Storm ............................ 370/390 |
| 5,550,914 A * | | 8/1996 | Clarke et al. ................... 379/230 |
| 5,600,707 A * | | 2/1997 | Miller, II ....................... 370/281 |
| 5,604,921 A * | | 2/1997 | Alanara .......................... 455/45 |
| 5,661,790 A | | 8/1997 | Hsu |
| 5,678,179 A * | | 10/1997 | Turcotte et al. ............... 455/466 |
| 5,722,074 A * | | 2/1998 | Muszynski .................... 455/442 |
| 5,737,701 A | | 4/1998 | Rosenthal |
| 5,794,156 A * | | 8/1998 | Alanara .......................... 455/517 |
| 5,802,465 A | | 9/1998 | Hamalainen |
| 5,884,175 A * | | 3/1999 | Schiefer et al. ............... 455/436 |
| 5,940,492 A * | | 8/1999 | Galloway et al. ............. 379/230 |
| 6,018,657 A * | | 1/2000 | Kennedy et al. ............ 455/426.1 |
| 6,021,433 A | | 2/2000 | Payne |
| 6,094,582 A * | | 7/2000 | Zimmermann ............ 455/452.2 |
| 6,097,961 A * | | 8/2000 | Alanara et al. ................ 455/466 |
| 6,108,325 A * | | 8/2000 | Stephanson et al. .......... 370/337 |
| 6,144,671 A * | | 11/2000 | Perinpanathan et al. ..... 370/409 |
| 6,185,288 B1 | | 2/2001 | Wong |
| 6,195,347 B1 * | | 2/2001 | Sehgal ........................... 370/354 |
| 6,198,929 B1 * | | 3/2001 | Krishnamurthi et al. ..... 455/439 |
| 6,301,242 B1 * | | 10/2001 | Lindsay et al. ............... 370/347 |
| 6,304,595 B1 * | | 10/2001 | Pettersson et al. ............ 375/222 |
| 6,338,140 B1 * | | 1/2002 | Owens et al. .................. 713/168 |
| 6,377,799 B1 * | | 4/2002 | Hameleers et al. ......... 455/422.1 |
| 6,425,131 B2 | | 7/2002 | Crandall |
| 6,430,410 B1 | | 8/2002 | Staber |
| 6,466,786 B1 * | | 10/2002 | Wallenius ...................... 455/433 |
| 6,487,425 B1 * | | 11/2002 | Thakker et al. ................ 455/574 |
| 6,584,321 B1 * | | 6/2003 | Coan et al. ..................... 455/466 |
| 6,606,486 B1 * | | 8/2003 | Cubbage et al. ............ 455/186.2 |
| 6,611,694 B1 * | | 8/2003 | Oltedal et al. ................. 455/560 |
| 6,696,921 B2 * | | 2/2004 | Helferich ...................... 340/7.21 |
| 6,728,548 B1 * | | 4/2004 | Willhoff ........................ 455/466 |
| 6,775,259 B1 | | 8/2004 | Ranta |
| 6,892,074 B2 | | 5/2005 | Tarkiainen |
| 7,088,990 B1 * | | 8/2006 | Isomursu et al. ........... 455/412.1 |
| 8,521,803 B2 * | | 8/2013 | Tisserand et al. ............. 709/200 |
| 2002/0160794 A1 * | | 10/2002 | Tisserand et al. ............. 455/466 |
| 2009/0046669 A1 * | | 2/2009 | Parantainen .................. 370/335 |
| 2013/0331134 A1 * | | 12/2013 | Tisserand et al. ............. 455/466 |

FOREIGN PATENT DOCUMENTS

| | | |
|---|---|---|
| JP | 8-125757 | 5/1996 |
| JP | 08-274895 | 10/1996 |
| JP | 10-164267 | 6/1998 |
| JP | 11-127192 | 5/1999 |
| JP | 2000-514616 | 10/2000 |
| WO | WO-98/02005 | 1/1998 |
| WO | WO-00/24225 | 4/2000 |

OTHER PUBLICATIONS

"Japanese Final Notice of Rejection (English Translation)", Japanese Application No. 2001-547807, Feb. 18, 2011, 4 pages.

"Japanese Interrogation", Japanese Application No. 2001-547807, Oct. 30, 2012, 2 pages.

"Japanese Interrogation (English Translation)", Japanese Application No. 2001-547807, Oct. 30, 2012, 5 pages.

"Japanese Notice of Rejection", Japanese Application No. 2001-547807, Jun. 8, 2010, 2 pages.

"Japanese Notice of Rejection (English Translation)", Japanese Application No. 2001-547807, Jun. 8, 2010, 3 pages.

"JP 05-007259 (Patent Abstracts of Japan)", English abstract, Jan. 14, 1993, 1 page.

"JP 08-274895 (Patent Abstracts of Japan)", English abstract, Oct. 18, 1996, 1 page.

"JP 10-164267 (Patent Abstracts of Japan)", English abstract, Jun. 19, 1998, 1 page.

"JP 11-127192 (Patent Abstracts of Japan)", English abstract, May 11, 1999, 1 page.

"JP 8-125757 (Partial Machine Translation)", May 17, 1996, 35 pages.

"United States Office Action", U.S. Appl. No. 09/913,885, Aug. 23, 2006, 11 pages.

"United States Office Action", U.S. Appl. No. 09/913,885, Dec. 30, 2004, 11 pages.

"United States Office Action", U.S. Appl. No. 09/913,885, Mar. 20, 2007, 11 pages.

"United States Office Action", U.S. Appl. No. 09/913,885, Nov. 23, 2007, 12 pages.

"United States Office Action", U.S. Appl. No. 09/913,885, May 5, 2008, 14 pages.

"United States Office Action", U.S. Appl. No. 09/913,885, Jul. 29, 2009, 17 pages.

"United States Office Action", U.S. Appl. No. 09/913,885, Nov. 13, 2008, 19 pages.

Glitho, Roch H., "Use of SS7 in D-AMPS-Based PCS: Orthodoxy vs. Heterodoxy", IEEE Personal Communications, US, IEEE Communications Society, vol. 4, No. 3, Jun. 1, 1997, 10 pages.

* cited by examiner

METHOD FOR TRANSMITTING MINI-MESSAGES AND ASSOCIATED DEVICE

This application claims the benefit of French Patent Application No. 99/16050 filed on Dec. 20, 1999, which is incorporated herein by reference. The application also claims the benefit of U.S. application Ser. No. 09/913,885, filed on Aug. 17, 2001, which is incorporated herein by reference.

BACKGROUND OF THE INVENTION

1. Field of the Invention

The present invention relates to a method of transmitting mini-messages. It also relates to a transceiver device associated with the method. The invention is applicable to the field of transmitting data through a transmission network. It is applicable more particularly to the field of transmissions in which the data transmission network is a mobile telephone network or an Integrated Services Digital Network (ISDN). An object of the invention is to transmit mini-messages through the transmission network between a caller and a called party at lower cost. However, a preferred application of the invention relates to transmitting a smart card code (such as a personal identification number (PIN)) to an authentication center by using a mobile telephone network as the transmission network.

2. Discussion of the Related Art

Currently, it is known that a message can be transmitted from a caller to a called party through a transmission network, such a message being a data structure comprising from a few bytes or even a few tens of bytes (the message may then be referred to as a "mini-message") to several thousands of bytes. In the state of the art, to transmit a message, it is necessary to set up a call between a caller and a called party, to transmit the message through the link, and finally to clear down the call once the interchange between the caller and the called party is finished.

When transmitting mini-messages, such a procedure poses problems. At the scale of a mini-message, the time required to set up a call, plus the call time, plus the time required to clear down the call gives a transmission time that is too burdensome.

In addition, when the mini-messages are smart card codes, for example, several tens of thousands of transactions can take place through the transmission network every day. Such a high number of transactions, associated with the state-of-the-art procedure gives rise to a load on the network that is very considerable. That load on the transmission network is tending to become increasingly large as a result of the ever-increasing number of applications that implement smart cards and of the ever-increasing number of associated transactions. It should also be specified that the use of a call through a transmission network is not free of charge. The resulting cost of sending mini-messages is non-negligible in view of the number of transactions.

SUMMARY OF THE INVENTION

Accordingly, the present invention is directed to a method of transmitting mini-messages, and a device associated with the method that substantially obviates one or more problems due to limitations and disadvantages of the related art.

An object of the present invention is to remedy those problems by proposing a method of transmitting such mini-messages. The method of the invention makes it possible to reduce the transmission time to a value that is as low as possible by transmitting data during the signaling phase associated with setting up a call through a transmission network. In addition, the method of the invention makes it possible to reduce the cost of calling through the transmission network.

Furthermore, the invention proposes a transceiver device for implementing the method of the invention.

The invention thus provides a method of sending a user message through a transmission network, the method being characterized in that: a request is activated to set up a call channel between a caller and a called party; and to set up the call channel, a signaling stage is performed during which a signaling message containing at least one spare field is interchanged between the caller and the called party; and in that: before the interchange between the called party and the caller, the user message is placed in the spare field of the signaling message; and the setting up of the call channel is terminated once the user message has been received by the called party and/or a reply to the receiver message has been received by the caller.

The invention also provides a transceiver device for transmitting a user message to a called party and for receiving a reply to the user message from a called party, said device being characterized in that it includes a dedicated memory, the dedicated memory serving to store the user message and/or the reply to the user message, the user message and/or the reply being sent in a spare field of a signaling message during a signaling stage.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The invention will be better understood on reading the following description and on examining the accompanying drawings. They are given merely by way of indication and they in no way limit the invention. In the figures.

DETAILED DESCRIPTION OF THE INVENTION

Reference will now be made in detail to the embodiments of the present invention, examples of which are illustrated in the accompanying drawings. Wherever possible, like reference numbers will be used for like elements.

Figure 1:
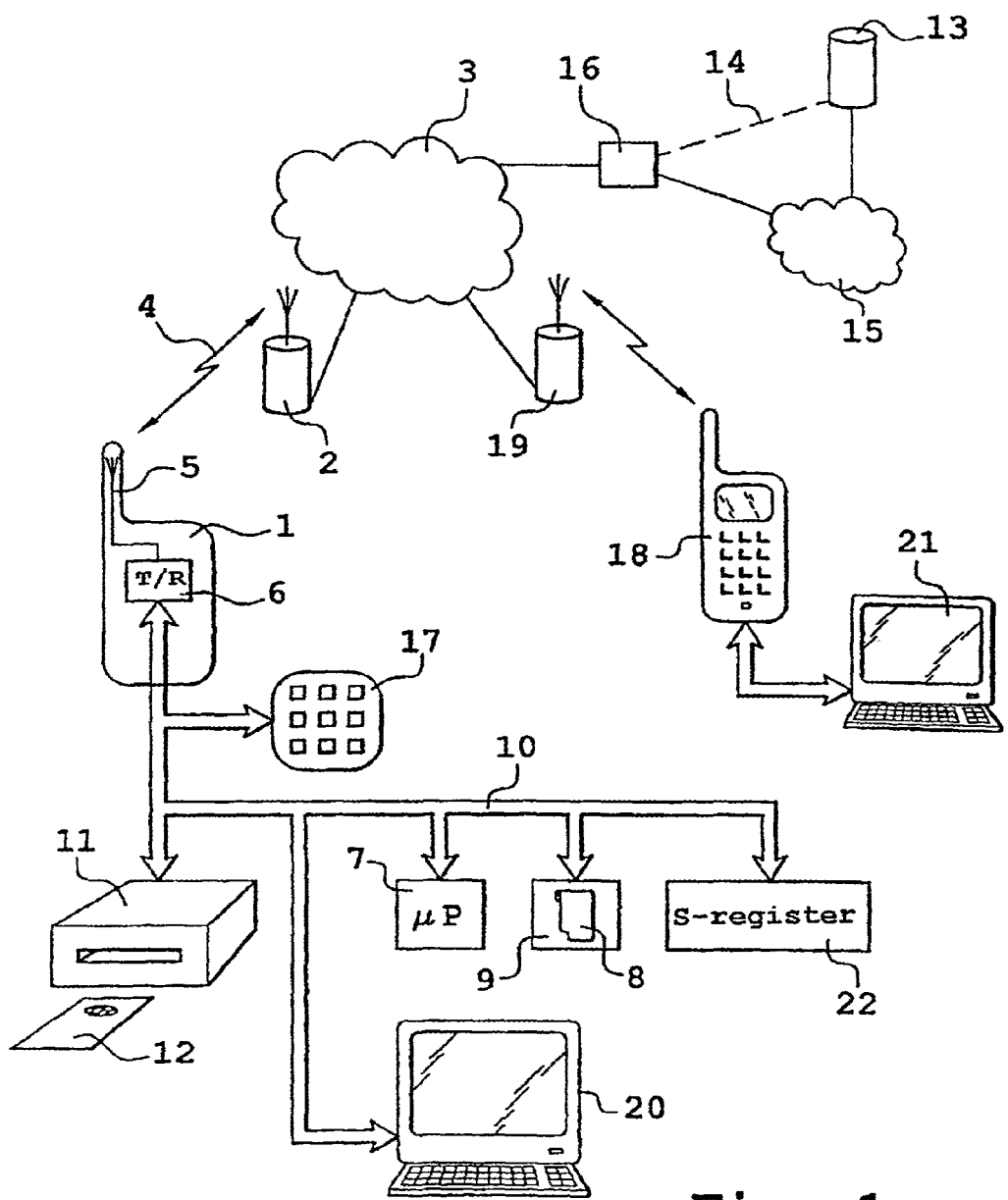
FIG. 1 shows a simplified architecture for a mobile telephone making it possible to implement the method of the invention.

FIG. 1 shows a preferred application of the invention. It shows a simplified architecture for a mobile telephone 1 implementing the method of the invention and connected to a base station 2 of a mobile telephone network 3 via a radio link 4. Thus, the telephone 1 is used to send or to receive a user message through a transmission network such as the network 3, for example. In particular for providing these transmit and receive functions, the telephone 1 is provided with an antenna 5 connected to a transceiver device 6. The device 6 is controlled by a microprocessor 7 under the control of a program 8 in a program memory 9 via a data, control, and address bus 10.

In this preferred example, in addition to its usual mobile telephony function, the telephone 1 is used as a communications interface, or a modem, between a distant party 13 and a reader 11 for reading a smart card 12. The reader 11 is preferably placed in the telephone 1, but it could also be merely connected thereto via a wire link. Thus, the distant party 13 is a center for authenticating the smart card 12. The center 13 is connected directly via a link 14 or indirectly via a fixed telephone network 15, for example, to a connection circuit 16 of the network 3. Thus, the telephone 1 sends to the center 13 a secret code of the card 12 and an identification number, the secret code and the identification number being placed in a spare field of the signaling message. The data unit made up of the secret code and of the identification number is referred to below as the "identifier".

In the invention, the user message is transmitted during a signaling stage associated with setting up a call between the telephone 1 and the center 13. For this purpose, use is made of a field left spare in the signaling messages interchanged between the telephone 1 and the device 13, as described in particular in GSM Standard 04.18. That Standard also defines a procedure for setting up a call in a mobile telephone network, in particular complying with the GSM Standard.

A "spare field" implies that a signaling message is of variable length. Naturally, when the spare field is not used, the portion corresponding to a given field is transmitted only if said field contains information. A signaling message is thus made up of various fields, each of which relates to a parameter, one of which specifies, in particular, a function associated with said message. The message may be a control message or a message for monitoring the various signaling stages required for setting up a call.

The secret code is produced from a keypad 17, e.g. of the telephone 1. More precisely, in this preferred embodiment of the invention, when the smart card 12 is inserted in the reader 11, and once a code has been entered on the keypad 17, then the microprocessor 7 activates a request to set up a call channel between the telephone 1 and the device 13.

According to a first essential characteristic of the invention, the microprocessor 7 uses one of the spare fields of a signaling message, prior to transmission, to place the user message in it. In the invention, the control message that is transmitted and that contains the user message is a special message. The special message is a signaling message in which a value of a parameter makes it possible to indicate to the called party, when said called party receives it, that a message is to be found in the field that is normally spare. To achieve this, it is possible to use a predefined value which indicates that the call protocol is known to the caller and to the called party. As a result, when the called party receives a signaling message containing such a parameter, then said called party knows where the user message is to be found. However, it is quite possible to produce a new value in addition to the predefined values and that would achieve the same result. Thus, the center 13 in turn transmits a signaling message which contains a reply to the user message, e.g. whether, as a function of the identifier transmitted with the user message, the authentication of the card 12 is positive or negative.

According to a second essential characteristic of the invention, the microprocessor 7 causes the call set-up to terminate once the message 4 has been received by the called party and/or once a reply to the message 4 has been received by the caller. That is to say that, if the telephone 1 transmits a message 4 and does not await a reply from the center 13, then said center can terminate call set-up. If, however, a reply is awaited by the telephone 1 (since, in this example said telephone is the transmitter of the user message), then it is the telephone that must terminate call set-up. In this document, it is considered that a call is fully set up when the called party accepts the call, i.e., more simply, when the called party answers. In the invention, the called party does not answer, but nevertheless receives the user message via the signaling messages. As a result, the cost of a call is zero since, generally, it is necessary to answer in order to initiate metering.

In a variant, the device 13 or the called party may be another mobile telephone 18, connected to a base station 19, for example, of the network 3. In which case, the telephone 1 and the telephone 18 may interchange mini-messages such as the user messages. In addition, the telephone 1 may be connected to a computer 20 thus using the telephone 1 as a modem. Similarly, the telephone 18 may be connected to a computer 21.

When a modem (the telephone 1 in this example) sets up a call channel, then it interchanges signaling messages with the called party, e.g. the telephone 18, and a signaling message is associated with a register, i.e. a memory zone. Thus, when the program 8 issues a command to transmit the user message, it associates it with a first signaling message, and when the telephone 1 receives a reply to the user message then said user message is associated with a second signaling message. This command is associated with a dedicated memory 22 which serves as a register. As a result, when the telephone 1 receives a reply to the user message, then said reply is stored automatically in the memory 22, generally under the control of a management sub-program associated with the program 8. Operation is the same at the center 13 and at the telephone 18, i.e. when the center 13 or the telephone 18 receive the user message, then said user message is stored in a dedicated memory (not shown), such as the memory 22. For smart cards, the center 13 thus stores in a dedicated memory a value for the secret code and a value for a card number, and a value stored in the register 22 may correspond to positive or negative acknowledgment by the center 13, depending on whether the code is accepted or refused, respectively.

In a preferred example, a user is authorized to access the memory 22 via specific commands. Thus, the user may place values to be transmitted therein and/or read received values therefrom. For this purpose, the user uses, in particular, the keypad 17 of the telephone 1 or the keyboard of the computer 20 if said computer is connected to the telephone 1. In an example, the specific commands are commands for controlling a modem. However, depending on needs, a user may produce new specific commands that are specific to said user and that may be referred to as "proprietary" commands.

In a preferred variant of the invention, the memory 22 is placed in the telephone 1. By using a dedicated memory such as the memory 22, it is possible for operation of the telephone 1 to be more flexible. The user knows that when such a signaling message is received, it is necessary merely to perform a read operation for reading from the associated dedicated memory, using the above-mentioned sub-program, in order to determine the value corresponding to the received message 4. The telephone 13 and the telephone 18 operate in the same way as regards the use of a dedicated memory.

In another variant, the memory 22 is placed in a modem (not shown) of the ISDN type. Such modems make it possible to connect a caller to a called party via an ISDN that is then used as a transmission network of the invention. In which case, taking the example of the computer 20, said computer is connected to the modems instead of being connected to the telephone 1. A signaling stage via an ISDN uses signaling messages which, as in the mobile telephone network 3, contain spare fields.

In a preferred example of the invention, the size of the user message is limited to 35 eight-bit bytes at maximum. A spare field can receive only data whose binary length is shorter than 35 bytes.

The function of the memory 22 is to store the user message and/or the reply to the user message, the user message and/or the reply being to be sent by means of a spare field in a signaling message. Thus, in the preferred example, the memory 22 has a memory capacity which is no more than 35 bytes. In another variant, and to enable the user message to be transmitted securely via the network 3 and the spare field, it is enciphered with an enciphering key so as to make one third of it incomprehensible. When the addressee of the user message receives the user message, then said addressee uses an associated deciphering key to make the information carried by the user message comprehensible.

Figure 2:
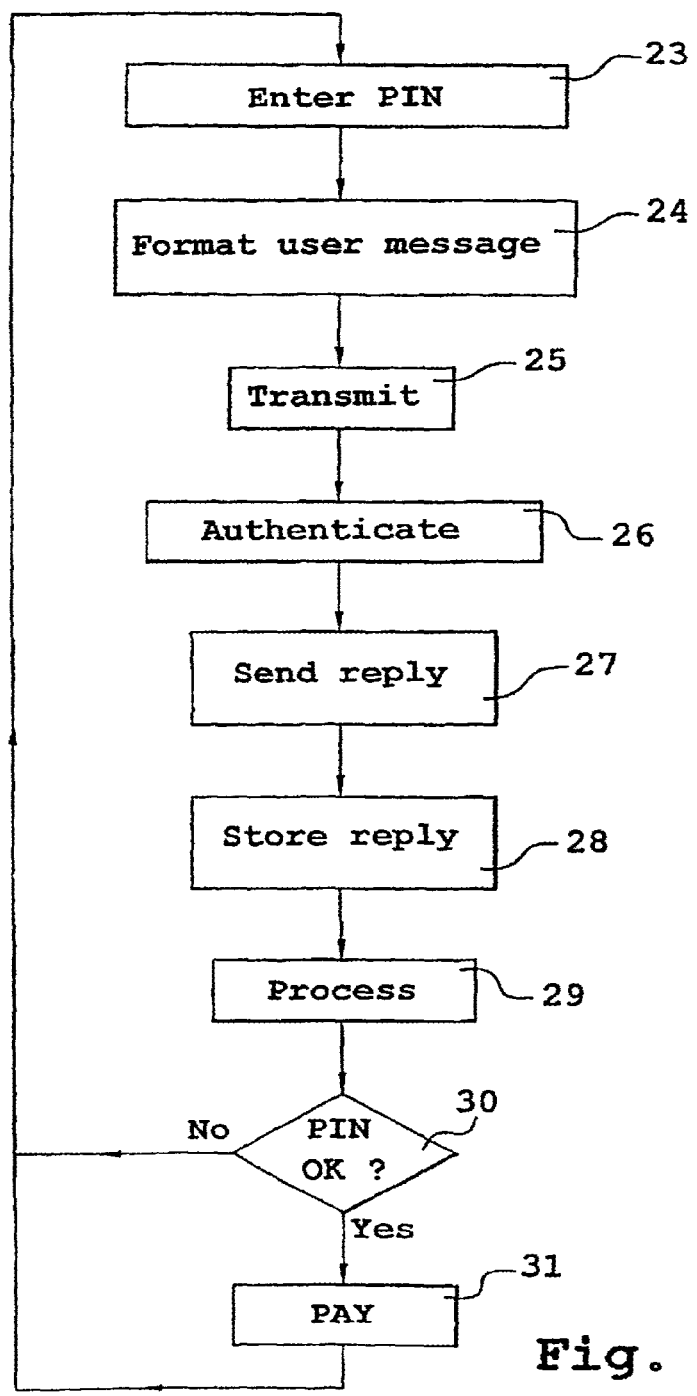
FIG. 2 shows an implementation of the method of the invention in the form of an algorithm.

FIG. 2 shows an implementation of the method of the invention in the form of an algorithm. Authenticating the PIN of a smart card such as the smart card 12 is given by way of example. The transceiver device used for this purpose is the telephone 1 of FIG. 1 with the reader 11. Thus, in a step 23, the PIN associated with the smart card 12 is entered by means of the keypad 17. Naturally, prior to this, the telephone 1 is configured for special operation, i.e. it operates as a smart card reader. A value for the PIN is stored in the memory 22 pending transmission of it.

In a formatting step 24, the program 8, or more precisely a sub-program of said program 8 causes the microprocessor 7 to forward the value stored in the memory 22 to the transceiver device 8 and thus to prepare the user message for transmission. The user message contains the PIN (enciphered in a preferred example), and it is inserted in a spare field of a signaling message. In a step 25, the signaling message containing the message 4 is transmitted to the authentication center 13 in this example. In a step 26, the center 13 proceeds to perform the authentication after deciphering the PIN which, in this example, is received as associated in particular with the identification number of the smart card 12. Once the authentication is finished, the center 13 transmits the reply associated with said authentication to the telephone 1, in a step 27.

In step 28, the telephone thus receives a reply to the user message transmitted in step 25, and it stores the reply from the center 13 in the memory 22. A processing program associated with the operation of the telephone 1 as a smart card reader retrieves contents of the memory 22 in a step 29. If the authentication message is positive at the end of a test step 30, then, in a step 31, the microprocessor 7 authorizes payment by informing a holder of the card 12 via an audible and/or visible message. When the authentication is negative, the authorization of step 31 is refused to the holder of the smart card 12. Thus, the invention makes it possible to reduce the time required to access the center 13 and thus the time required for the reply, while also thereby limiting the cost of calling through the network 3.

This description is based on an example concerning the authentication of a smart card PIN, but naturally, the method of the invention may be used to transmit any message of a few tens of bytes to a called party. Thus, the field of the invention more generally concerns transmitting data through a transmission network of the GSM or ISDN type.

It will be apparent to those skilled in the art that various modifications and variations can be made in the method of transmitting mini-messages, and a device associated with the method of the present invention without departing form the spirit or scope of the invention. Thus, it is intended that the present invention cover the modifications and variations of this invention provided they come within the scope of the appended claims and their equivalents.

The invention claimed is:

1. A method of receiving a user message at a first network node through a transmission network, the method comprising:
    receiving at the first network node a signaling message as part of an attempt to establish a connection between a second network node and the first network node through the transmission network, the signaling message including a spare field containing a user message; and
    responsive to successfully receiving the signaling message including the user message contained in the spare field, terminating the attempt to establish the connection between the first network node and the second network node before the connection is established.

2. The method of claim 1 wherein the signaling message further includes a data field containing an indicator that the signaling message includes the user data in the spare field, the method further comprising:
    detecting the indicator in the data field.

3. A transceiver for receiving a user message through a transmission network, the transceiver comprising:
    a memory: and
    a processor adapted to receive a signaling message as part of an attempt to establish a connection between a network node and the transceiver through the transmission network, the signaling message including a spare field containing a user message and, responsive to successfully receiving the signaling message including the user message contained in the spare field, terminating the attempt to establish the connection between the transceiver and the network node before the connection is established.

4. The transceiver of claim 3 wherein the signaling message further includes a data field containing an indicator that the signaling message includes the user data in the spare field, the processor further adapted to detect the indicator in the data field.

5. A method implemented in a first node on a network of sending a user message through a transmission network from the first node on the network to a second node on the network, the method comprising:
    generating, a signaling message as part of an attempt to establish a connection through the transmission network with the second node of the network, the signaling message including a spare field including a user message;
    transmitting the signaling message to the second node through the transmission network; and
    terminating the attempt to establish the connection responsive to receiving a reply to the signaling message from the second node and before the connection is established.

6. The method of claim 5 further comprising:
    including in the signaling message a parameter that indicates that the user message is in the spare field.

7. The method according to claim 5 further comprising storing the reply in a dedicated memory of the first node.

8. The method according to claim 7, further comprising:
    receiving a command; and
    responsive to receiving the command, reading the reply from the dedicated memory;
    determining a status indicated by the reply; and
    if the status is positive, authorizing a payment to be made.

9. The method according to claim 8, wherein the user message includes a personal identification number (PIN) associated with a smart card, the determining includes determining whether the status indicates that the smart card was authorized, and the authorizing includes authorizing the payment to be made if the status indicates that the smart card is authorized.

10. The method according to claim 5, further comprising enciphering the user message.

11. The method according to claim 5, wherein generating the signaling message further comprises generating one of a control message and a message for monitoring a plurality of signaling stages included in the attempt to establish the connection with the second node.

12. The method according to claim 5, wherein the reply is received in a spare field in a reply signaling message as part of the attempt to establish the connection between the first network node and the second network node through the transmission network.

13. A transceiver for sending a user message through a transmission network from a first node on the network to a second node on the network, the transceiver comprising:
 a memory: and
 a processor adapted to generate a signaling message as part of an attempt to establish a connection through the transmission network with the second node of the network, the signaling message including a spare field including a user message, transmit the signaling message to the second node through the transmission network, and terminate the attempt to establish the connection responsive to receiving a reply to the signaling message from the second node and before the connection is established.

14. The transceiver of claim 13 wherein the processor is further adapted to include in the signaling message a parameter that indicates that the user message is in the spare field.

15. The transceiver according to claim 13 wherein the memory is a dedicated memory and the processor is further adapted to store the reply in the dedicated memory.

16. The transceiver according to claim 15 wherein the processor is further adapted to receive a command and, responsive to receiving the command, read the reply from the dedicated memory;
 determine a status indicated by the reply and, if the status is positive, authorize a payment to be made.

17. The transceiver according to claim 16 wherein the user message includes a personal identification number (PIN) associated with a smart card, the determining includes determining whether the status indicates that the smart card was authorized, and the authorizing includes authorizing the payment to be made if the status indicates that the smart card is authorized.

18. The transceiver according to claim 13 wherein the processor is further adapted to encipher the user message.

19. The transceiver according to claim 13 wherein, when the processor generates the signaling message, the processor further generates one of a control message and a message for monitoring a plurality of signaling stages included in the attempt to establish the connection with the second node.

20. The transceiver according to claim 13 wherein the transceiver receives the reply in a spare field in a reply signaling message as part of the attempt to establish the connection between the first network node and the second network node through the transmission network node.

* * * * *